United States Patent Office 3,808,194
Patented Apr. 30, 1974

3,808,194
DISAZO DYES CONTAINING A BIS-UREA
BRIDGING GROUP
Bernhard Piller and John Lenoir, Marly-le-Petit, Switzerland, assignors to Ciba-Geigy AG, Basel, Switzerland
No Drawing. Filed Aug. 11, 1971, Ser. No. 170,964
Claims priority, application Switzerland, Aug. 19, 1970,
12,372/70
Int. Cl. C09b 35/02, 35/26, 43/12
U.S. Cl. 260—175                                   6 Claims

ABSTRACT OF THE DISCLOSURE

Azo dyestuff of the formula (1)

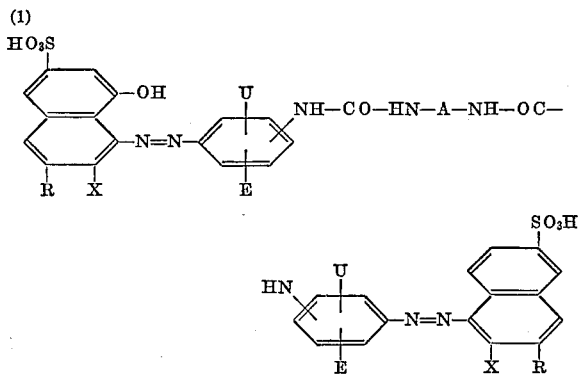

wherein A denotes optionally substituted alkylene, phenylene or naphthylene, an optionally substituted heterocyclic radical with 5- or 6-ring members, containing O, S or N atoms as ring members, or a radical of the formula (1.1)

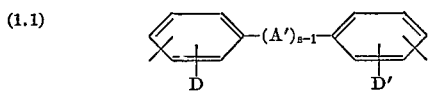

wherein A' represents —(CH$_2$)$_r$—, —CO—, —NH—, —O—, —S—, —SO$_2$— or —N=N—, $s$ denotes 1 or 2, $r$ denotes an integer from 1 to 4 and D and D' each denote hydrogen, halogen, lower alkyl or lower alkoxy, R denotes hydrogen or a sulphonic acid group, X denotes a hydrogen atom, an amino group or an amino group substituted by alkyl, cycloalkyl or substituted phenyl, E denotes a hydrogen atom, a sulphonic acid group or a lower alkoxy group and U denotes a hydrogen atom or a lower alkyl or alkoxy group which dyestuff is used as an image dyestuff in the silver dye bleach process and is unusually diffusion-resistant, is readily soluble in water, is insensitive to calcium ions, is capable of being bleached completely to white, and has exceptionally pure, brilliant color shades, and high color strength.

The azo dyestuffs of the invention are useful, inter alia, in photographic light sensitive materials.

The subject of the invention are azo dyestuffs of the formula (1)

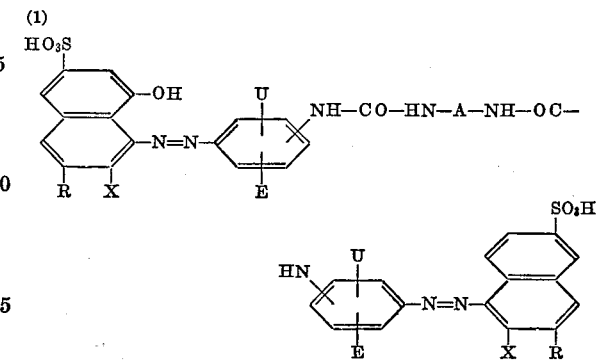

wherein A denotes optionally substituted alkylene, phenylene or naphthylene, an optionally substituted heterocyclic radical with 5- or 6-ring members, containing O, S or N atoms as ring members, or a radical of the formula (1.1)

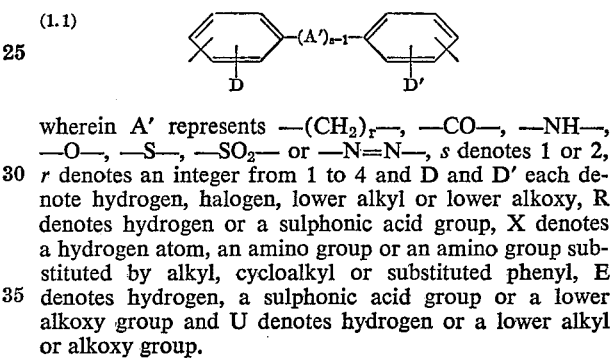

wherein A' represents —(CH$_2$)$_r$—, —CO—, —NH—, —O—, —S—, —SO$_2$— or —N=N—, $s$ denotes 1 or 2, $r$ denotes an integer from 1 to 4 and D and D' each denote hydrogen, halogen, lower alkyl or lower alkoxy, R denotes hydrogen or a sulphonic acid group, X denotes a hydrogen atom, an amino group or an amino group substituted by alkyl, cycloalkyl or substituted phenyl, E denotes hydrogen, a sulphonic acid group or a lower alkoxy group and U denotes hydrogen or a lower alkyl or alkoxy group.

The lower alkyl or alkoxy radicals occurring in D, D', E and U as a rule contain at most 4 carbon atoms. These radicals can, for example, be methyl, ethyl, n-butyl, ethoxy, n-propoxy, hydroxyethoxy or methoxyethoxy, but can also be substituted radicals such as, for example, the trifluoromethyl group.

Preferably, the dyestuffs in question are azo dyestuffs of the formula (2)

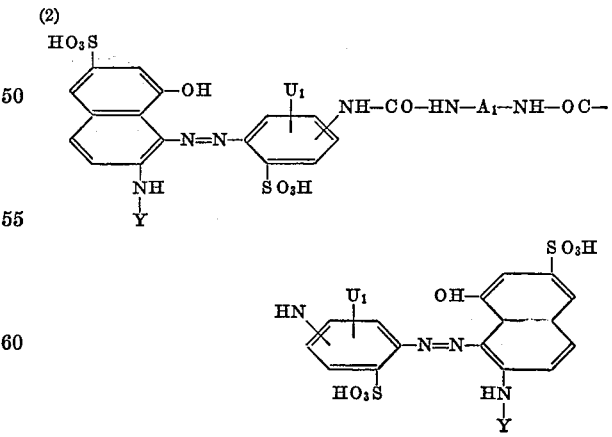

wherein $A_1$ denotes alkylene with 1 to 10 carbon atoms, phenylene, naphthylene or pyridylene which are optionally substituted by lower alkyl or halogen, or a radical of the formula (2.1) 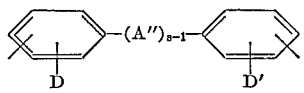

wherein D and D' have the indicated meanings and A'' represents —$CH_2$—, —CO—, —NH—, —O—, —S—, —$SO_2$— or —N=N—, Y denotes hydrogen, an alkyl or cycloalkyl radical or a substituted phenyl radical and $U_1$ denotes hydrogen or the methyl or methoxy radical, and s has the indicated meaning.

Advantageous properties are in particular displayed by azo dyestuffs of the formula (3) 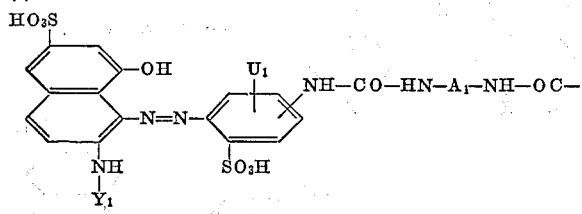

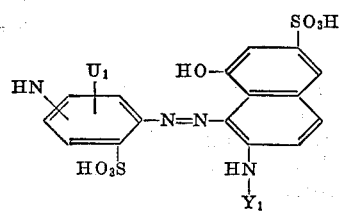

wherein $Y_1$ denotes hydrogen, a lower alkyl radical or a phenyl radical which is substituted by halogen, optionally substituted lower alkyl, lower alkoxy, phenoxy, carboxylic acid, sulphonic acid, lower alkylcarbonyl or lower alkylsulphonyl, and $A_1$ and $U_1$ have the indicated meanings.

The lower alkyl radicals occurring in $Y_1$ as a rule contain at most 4 carbon atoms. If $Y_1$ represents a substituted phenyl radical, its substituents can be substituted yet further, alkyl radicals, for example, being substituted by halogen atoms, as in the case of the trifluoromethyl group, or by hydroxyl groups, as in β-hydroxyethyl groups.

Advantageous azo dyestuffs correspond to the formula (4) 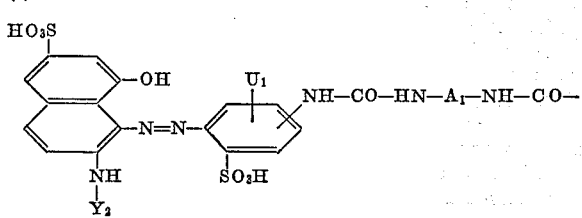

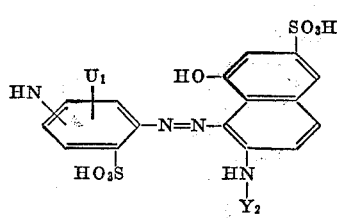

wherein $Y_2$ represents hydrogen, alkyl with 1 to 4 carbon atoms or a radical of the formula (4.1) 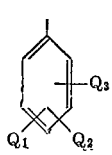

wherein $Q_1$ denotes halogen, optionally substituted lower alkyl, lower alkoxy, phenoxy, lower alkylcarbonyl or lower alkylsulphonyl, a carboxylic acid group or a sulphonic acid group, $Q_2$ denotes hydrogen, halogen, optionally substituted lower alkyl, lower alkoxy or a sulphonic acid group and $Q_3$ denotes hydrogen or lower alkyl, and $A_1$ and $U_1$ have the indicated meanings. What has been stated for the radical $Y_1$ with regard to its substituents also applies to the substituents $Q_1$, $Q_2$ and $Q_3$.

Particularly preferred azo dyestuffs are those of the formula (5) 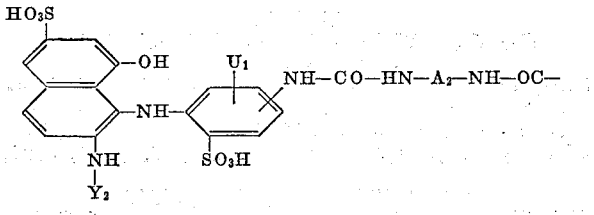

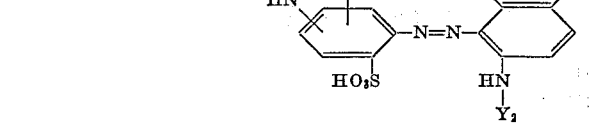

wherein $A_2$ represents a radical of the formula

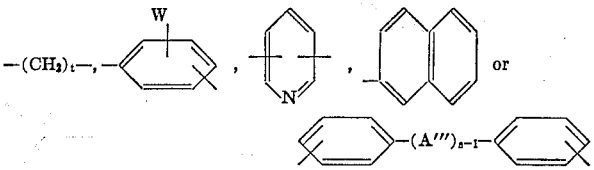

wherein t denotes an integer from 1 to 6, W denotes hydrogen or methyl, A''' denotes —$CH_2$—, —CO—, —O—, —S— or —$SO_2$— and $Y_2$, $U_1$ and s have the indicated meanings.

Amongst these azo dyestuffs, those of the formula (6) 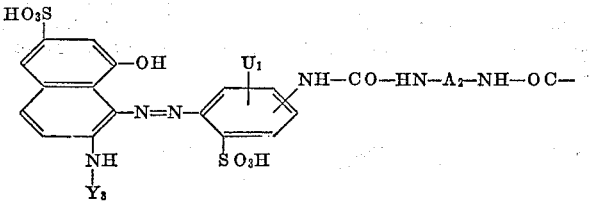

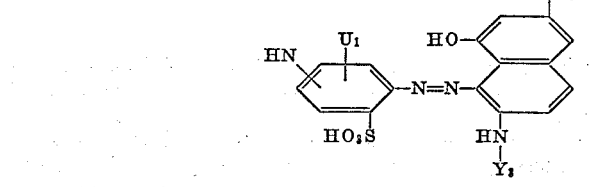

are in turn preferred, wherein $Y_3$ represents hydrogen, methyl or a radical of the formula (6.1) 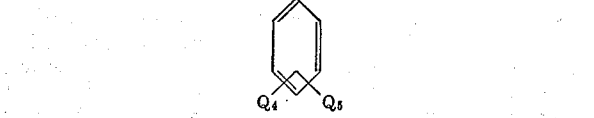

wherein $Q_4$ denotes fluorine, chlorine, bromine, trifluoromethyl, methyl, methoxy, methylcarbonyl, methylsulphonyl or a sulphonic acid group and $Q_5$ denotes hydrogen, chlorine, methyl or methoxy, and $A_2$ and $U_1$ have the indicated meanings.

Advantageous azo dyestuffs correspond to the formula (7)

[Structure showing naphthalene with HO₃S, OH, NH-Y₄ groups linked via N=N azo bond to phenyl with U₁, SO₃H, NH-CO-HN-A₃-NH-CO- linked to another phenyl with HN-Y₄, U₁, HO₃S, connected via N=N to naphthalene with HO, SO₃H]

wherein $U_1$ has the abovementioned meaning and $A_3$ denotes a radical of the formula $-(CH_2)_6-$, [phenyl], [phenyl-CH₃],

[phenyl-CH₂-phenyl]

or [phenyl-SO₂-phenyl] and $Y_4$ denotes hydrogen, methyl or the radical of the formula

[phenyl with Q₅, Q₆ substituents]

wherein $Q_5$ has the indicated meaning and $Q_6$ represents chloride, methyl or methoxy.

Azo dyestuffs of the formula (8)

[Structure showing HO₃S-naphthalene-OH with NH-Y₅ linked via N=N to phenyl-U₁-SO₃H with NH-CO-HN-A₃-NH-OC- linked to phenyl-U₁-HN-Y₅ linked via N=N to naphthalene with HO, SO₃H, NH-Y₅]

and of the formula (9)

[Structure: HO₃S-naphthalene-OH, HN-Y₅, N=N to phenyl-SO₃H-NH-CO-HN-A₃-NH-OC- to phenyl with HN-Y₅ linked via N=N-HO₃S to naphthalene with HO, SO₃H, NH-Y₅]

wherein $A_3$ and $U_1$ have the indicated meanings, and $Y_5$ denotes hydrogen, methyl or the radical

[2,6-dimethylphenyl: H₃C-phenyl-CH₃]

stand in the forefront of interest.

Particularly suitable azo dyestuffs correspond to the formula (10)

[Structure: HO₃S-naphthalene-OH linked via N=N (with NH-aryl(CH₃)₂ group) to phenyl-SO₃H-NH-CO-HN-phenyl-NH-OC-HN-phenyl-SO₃H linked via N=N to HO-naphthalene-SO₃H with HN-aryl(CH₃)₂]

or (11)

[Structure: HO₃S-naphthalene-OH-NH₂ linked via N=N to phenyl-SO₃H-NH-OC-HN-phenyl-CH₂-phenyl-NH-OC-HN-phenyl-HO₃S linked via N=N to HO-naphthalene-SO₃H-H₂N]

The dyestuffs of the Formula 1 to 11 cannot only, as shown, be in the form of their free acids, that is to say with HOOC— or HO₃S— groups, but also in the form of a salt. Depending on the conditions of isolation, for example on the chosen pH value or on the cation which the salt used for the isolation process contains, the acid groups may be present as —SO₃— or —COO-cation groups, such as, for example, —SO₃Na, —SO₃K, (—SO₃)₂Ca, —COONa, —COOLi or —COONH₄. Thus, preferably, the salts are salts of the alkaline earth group or especially of the alkali group.

The radicals of the formula (12)

[Structure: HO₃S-naphthalene-OH with R, X substituents]

in the Formula 1 are, for example, derived from the following compounds:
2-amino-8-hydroxynaphthalene-6-sulphonic acid,
2-(2'-methylphenylamino)-8-hydroxynaphthalene-6-sulphonic acid,
2-(2',6'-dimethylphenylamino)-8-hydroxynaphthalene-6-sulphonic acid,
2-(2',6'-diethylphenylamino)-8-hydroxynaphthalene-6-sulphonic acid,
2-(2',4',6'-trimethylphenylamino)-8-hydroxynaphthalene-6-sulphonic acid,
2-(2',3',4',6'-tetramethylphenylamino)-8-hydroxynaphthalene-6-sulphonic acid,
2-(2',6'-dimethoxyphenylamino)-8-hydroxynaphthalene-6-sulphonic acid,
2-dimethylamino-8-hydroxynaphthalene-6-sulphonic acid,
2-diethylamino-8-hydroxynaphthalene-6-sulphonic acid,
2-β-hydroxyethylamino-8-hydroxynaphthalene-6-sulphonic acid,
2-n-butylamino-8-hydroxynaphthalene-6-sulphonic acid,
2-cyclohexylamino-8-hydroxynaphthalene-6-sulphonic acid,
2-(2',6'-dimethylphenylamino)-8-hydroxynaphthalene-3,6-disulphonic acid,
2-methylamino-8-hydroxynaphthalene-6-sulphonic acid,
2-(2'-propenylamino-8-hydroxynaphthalene-6-sulphonic acid,
2-amino-8-hydroxynaphthalene-3,6-disulphonic acid, and
2-di(β-hydroxyethylamino)-8-hydroxynaphthalene-6-sulphonic acid.

The radicals of the Formula 12 are further derived from compounds of, for example, the following formulae:

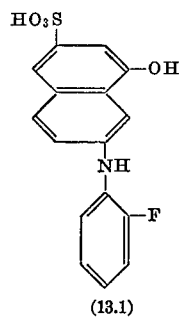 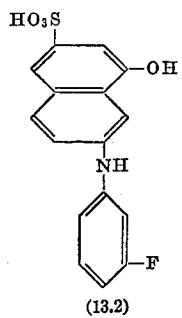

(13.1) (13.2)

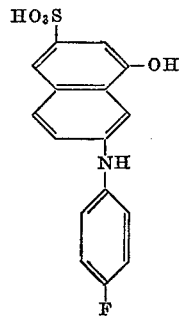 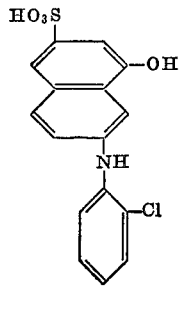

(13.3) (13.4)

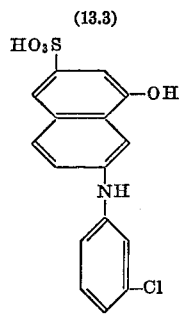 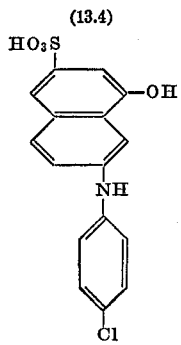

(13.5) (13.6)

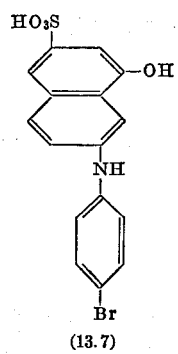 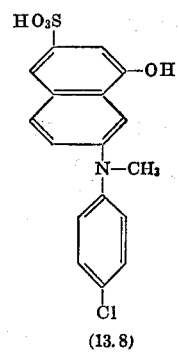

(13.7) (13.8)

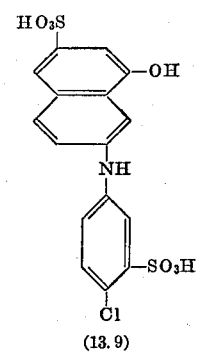 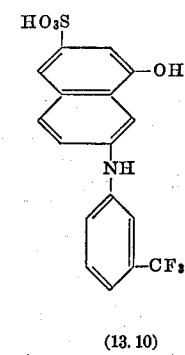

(13.9) (13.10)

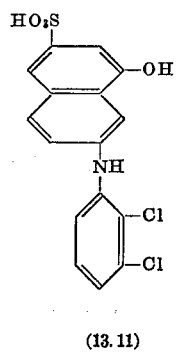 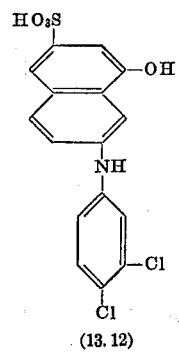

(13.11) (13.12)

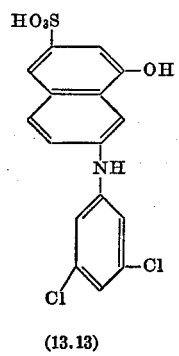 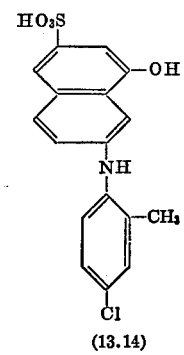

(13.13) (13.14)

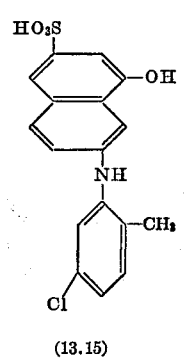 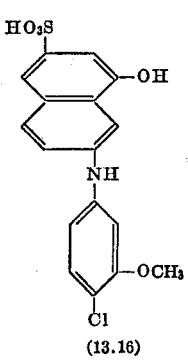

(13.15) (13.16)

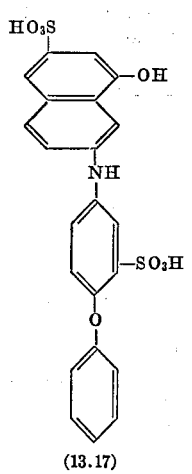
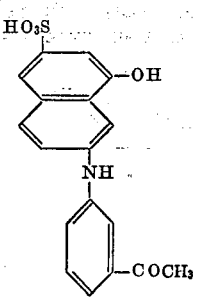
(13.17)  (13.18)

(13.19)  (13.20)
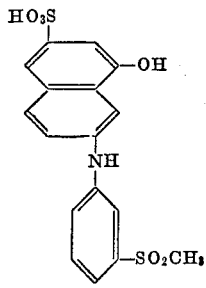
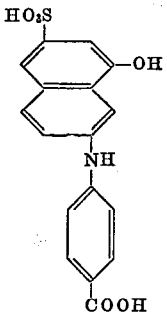

(13.21)  (13.22)
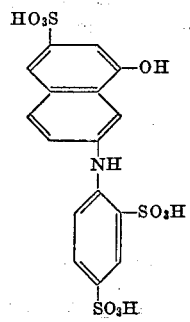
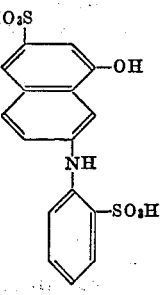

(13.23)  (13.24)
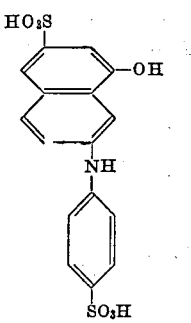
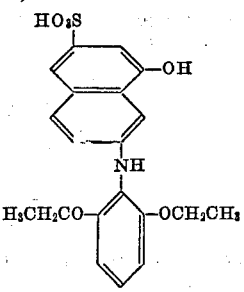

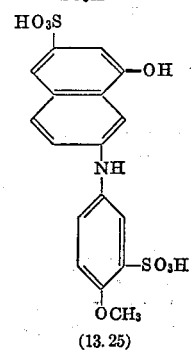
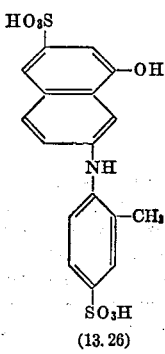
(13.25)  (13.26)

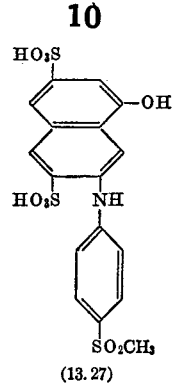
(13.27)

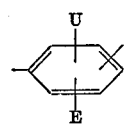

The radicals in the Formula 1 are derived, for example, from the following compounds:

1-amino-4-nitrobenzene,
1-amino-4-nitrobenzene-2-sulphonic acid,
1-amino-4-nitrobenzene-3-sulphonic acid,
1-amino-5-nitrobenzene-2-sulphonic acid,
1-amino-4-acetylaminobenzene-2-sulphonic acid,
1-amino-5-acetylaminobenzene-2-sulphonic acid,
1-amino-2-methyl-4-nitrobenzene,
1-amino-2-trifluoromethyl-4-nitrobenzene,
1-amino-2-methoxy-4-nitrobenzene,
1-amino-2-chloro-4-nitrobenzene,
1-amino-5-methyl-4-nitrobenzene-2-sulphonic acid,
1-amino-2,5-dimethoxy-4-nitrobenzene,
1-amino-4-methyl-5-nitrobenzene-2-sulphonic acid,
1-amino-2,3-dimethyl-4-nitrobenzene,
1-amino-2,5-diethoxy-4-nitrobenzene,
1-amino-2,5-di(2'-hydroxyethoxy)4-nitrobenzene,
1-amino-2,5-di(2'-methoxyethoxy)4-nitrobenzene,
1-amino-4-acetylamino-5-methoxybenzene-2-sulphonic acid,
1-amino-4-methoxy-5-nitrobenzene-2-sulphonic acid,
1-amino-2- or -3-methylbenzene,
1-amino-2,5- or -2,6-dimethylbenzene,
1-amino-2- or -3-methoxybenzene,
1-amino-2-ethoxybenzene,
1-amino-2-β-hydroxyethoxybenzene,
1-amino-2-β-methoxyethoxy-5-methylbenzene,
1-amino-3-acetylaminobenzene,
aminobenzene,
1-amino-2-methoxy-5-methylbenzene,
1-amino-3-methoxymethoxybenzene,
1-amino-2,5-dimethoxybenzene, and
1-amino-2,5-diethoxybenzene.

Radicals of the formula

(14)  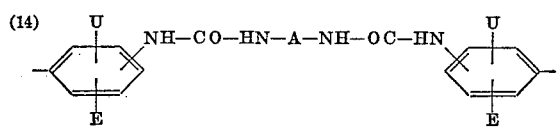

in the Formula 1 are derived, for example, from the following compounds:

(14.1)
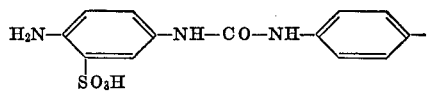

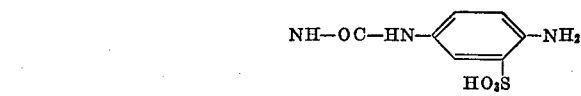

(14.2)

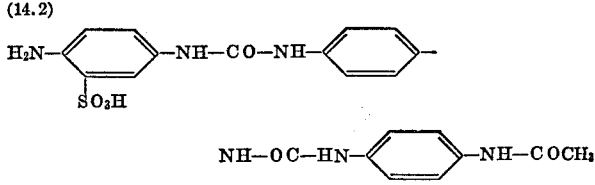

The radical A in the Formula 1 is derived from diisocyanates, for example from hexamethylenediisocyanate,
1-chloro-trimethylene-diisocyanate,
phenylene-1,3-diisocyanate,
phenylene-1,4-diisocyanate,
4-methyl-phenylene-1,3-diisocyanate,
tetrafluoro-phenylene-1,3-diisocyanate,
5-nitro-phenylene-1,3-diisocyanate,
furane-2,5-diisocyanate, thiophene-2,5-diisocyanate,
3,4-dimethyl-thiophene-2,5-diisocyanate,
pyridine-2,4-, -2,5-, -2,6- or -3,5-diisocyanate,
azobenzene-3,3'- or 4,4'-diisocyanate,
4,4'-dimethylazobenzene-3,3'-diisocyanate,
3,3'-dichloroazobenzene-4,4'-diisocyanate,
2,2'-dichloroazobenzene-5,5'-diisocyanate,
4-methoxyazobenzene-3,4'-diisocyanate,
4-n-butoxyazobenzene-3,4'-diisocyanate,
diphenylmethane-4,4'-diisocyanate,
diphenylbutane-4,4'-diisocyanate,
3-methoxy-diphenylmethane-4,4'-diisocyanate,
naphthylene-2,6-diisocyanate,
diphenylketone-3,3'-, -3,4'- or 4,4'-diisocyanate,
diphenylamine-4,4'-diisocyanate,
diphenylether-4,4'-diisocyanate,
diphenylsulphide-4,4'-diisocyanate and
diphenylsulphone-4,4'-diisocyanate.

The dyestuffs of the Formula 1 can be manufactured according to various processes which are in themselves known. A first process is characterized in that at least one compound of the formula (15)

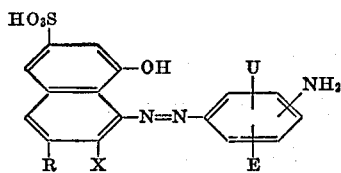

is reacted with a diisocyanate of the formula

(16)          OCN—A—NCO wherein A, R, X, U and E have the indicated meanings.

A second process is characterized in that 1 mol of a tetrazo compound of a diamine of the formula (17)

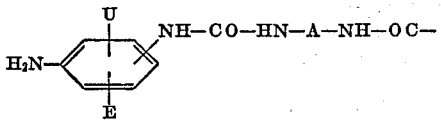

is coupled with 2 mols of a compound of the formula (18)

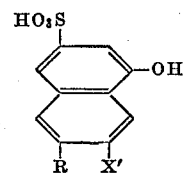

wherein A, R, U and E have the indicated meanings and X' denotes a primary, secondary or tertiary amino group.

A third process is further characterized in that a diazo compound of an amine of the formula (19)

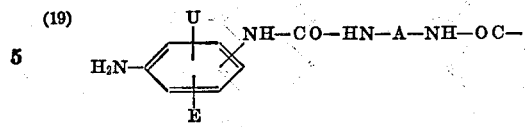

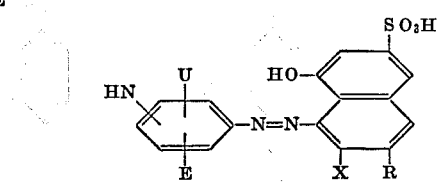

wherein A, R, X, U and E have the indicated meanings, is coupled with a compound of the Formula 18.

In the first process, and if X represents a primary, secondary or tertiary amino group, an appropriate procedure is to diazotize a compound of one of the formulae (20)

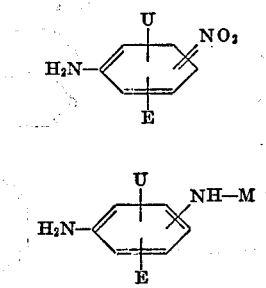

or (20.1)

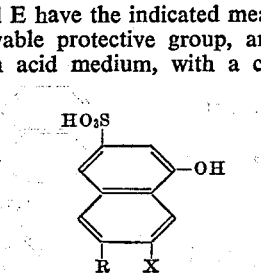

wherein U and E have the indicated meanings and M denotes a removable protective group, and to couple the product, in an acid medium, with a compound of the formula

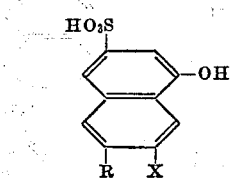

wherein R and X have the indicated meanings. After reduction of the nitro group or removal of the protective group, respectively, the compound of the Formula 15 is obtained.

If X represents a hydrogen atom, an appropriate procedure is to diazotize a compound of the formula (21)

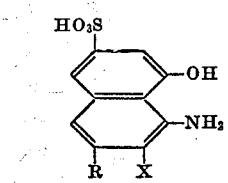

and couple the product, in an acid medium, to an amine of the formula (22)

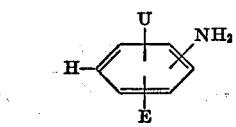

wherein X, R, U and E have the indicated meanings. Here it is of advantage to protect the free hydroxyl group, before the reaction, by a suitable protective group which is subsequently split off again.

It is now possible to link 2 mols of the compound of the Formula 15 with 1 mol of diisocyanate of the Formula 16 to give a symmetrical dyestuff of the Formula 1.

In the second process, an advantageous procedure is to tetrazotize 1 mol of diamine of the Formula 17 and couple the product with 2 mols of a compound of the Formula 18 to give the dyestuff of the Formula 1.

Finally, it is also possible, in the third process, to diazotize a compound of the Formula 19 and to couple the product, in an acid medium, with a compound of the Formula 18 so as to obtain the dyestuff of the Formula 1.

The condensation of amines with diisocyanates takes place in accordance with methods which are in themselves known and is advantageously effected in a polar solvent such as water, or in a polar organic solvent such as pyridine, methanol, glycol, diethylacetamide, dimethylformamide or N-methylpyrrolidone.

The dyestuffs of the Formula 1 can be used for various purposes, for example in photographic light-sensitive materials and, in this case, particularly advantageously as image dyestuffs for the silver dye bleach process. Accordingly, valuable photographic materials which carry, on a layer support, at least one layer containing a dyestuff of the Formula 1, can be manufactured in the usual manner, which is in itself known.

In particular, these dyestuffs can be present in a multilayer material which contains, on a layer support, a layer dyed with a green-blue dyestuff, which is selectively sensitive to red, on top of this a layer dyed purple with a dyestuff of the Formula 1, which is selectively sensitive to green, and finally a layer dyed with a yellow dyestuff, which is sensitive to blue. It is however also possible to incorporate the dyestuffs of the Formula 1 in an auxiliary layer or, in particular, in a layer adjacent to the light-sensitive layer.

The dyestuffs of the Formula 1 are at the same time unusually diffusion-resistant, but also easily soluble in water, insensitive to calcium ions and capable of being bleached completely to white.

The dyestuffs according to the invention also offer numerous possibilities for varying the spectral properties and are distinguished by exceptionally pure and brilliant color shades and by high color strength.

The extremely favorable shape of the spectral absorption curve permits these purple dyestuffs to be combined in numerous ways with one each of a suitable yellow dyestuff and a suitable blue-green dyestuff. Grey shades which appear neutral to the eye over the entire density range are thereby achieved.

The dyestuffs of the Formula 1 are in particular distinguished by high fastness to light, color strength, diffusion resistance and solubility in water, as well as a colorimetrically favorable shape of the absorption spectrum in visible light.

MANUFACTURING EXAMPLES

Example 1

(1.1) 11.5 g. of 3-aminoacetanilide-4-sulphonic acid in 10 ml. of water and 10 ml. of 35% strength hydrochloric acid are diazotized in the usual manner with 12.5 ml. of 4 N sodium nitrite solution at 5° C.

After destroying the excess nitrite, the diazo solution is added, at 5 to 8° C. and pH 3.5, to a suspension of 18.0 g. of the compound of the formula 101.1)

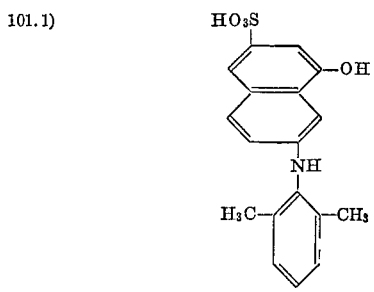

in a solution of 10.0 g. of crystalline sodium acetate in 100 ml. of water. After 3 hours, the cooling bath is removed and the mixture is stirred for 12 hours at room temperature.

The mixture is warmed to 65° C. for 10 minutes and the dyestuff of the Formula 101.2 which has separated out as a dark red powder is filtered off at 40° C. The yield is almost quantitative (101.2)

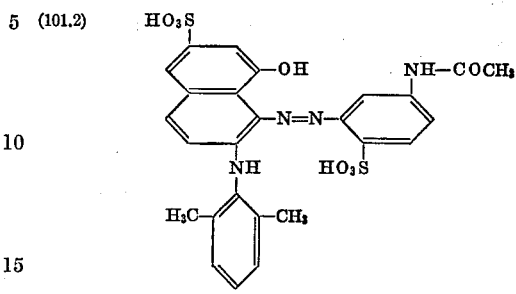

(1.2) 5.8 g. of product of the Formula 101.2 are stirred for 8 hours at 60° C. in a mixture of 50 ml. of water and 50 ml. of 35% strength hydrochloric acid. The product is filtered off and successively washed with water and isopropanol, and the dyestuff of the Formula 101.3 is obtained in the form of a red powder in approx. 90% yield.

(.3)

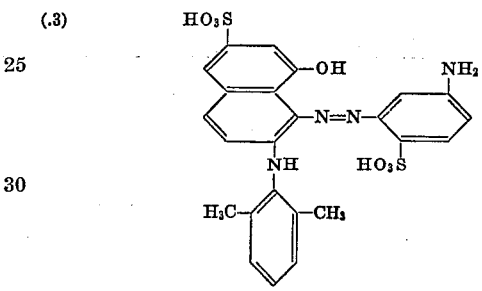

(1.3) A neutral solution of 1.1 g. of product of the Formula 101.3 in 40 ml. of water is treated repeatedly with a solution consisting, for each treatment, of 0.1 g. of phenylene-1,4-diisocyanate in 2 ml. of acetone, at room temperature, until starting product is no longer detectable in a thin layer chromatogram.

The product is precipitated by adding dioxane, the mixture is filtered, the residue is suspended in dimethylformamide, undissolved by-product is filtered off, and the filtrate is treated with isopropanol. After filtration and drying, 0.9 g. of dyestuff of the Formula 101 of Table I is obtained in the form of a claret powder which behaves as a single substance in a thin layer chromatogram.

EXAMPLE 2

(2.1) 1.2 g. of the monoazo dyestuff of the formula

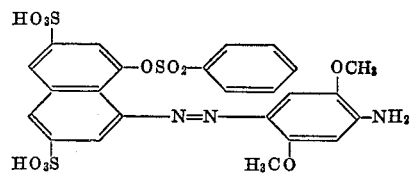

are reacted with hexamethylene-1,6-diisocyanate analogously to Example 1.3, whereupon 0.2 g. of the product of the formula

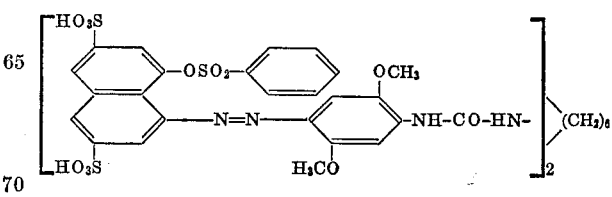

is obtained in the form of a brown powder.

(2.2) 0.2 g. of the product obtained are introduced into 50 ml. of 5% strength aqueous potassium hydroxide solution and the mixture is stirred for 30 minutes at 55° C. under a nitrogen atmosphere. It is then stirred for 12 hours at room temperature under a nitrogen atmosphere, and the dyestuff of the formula

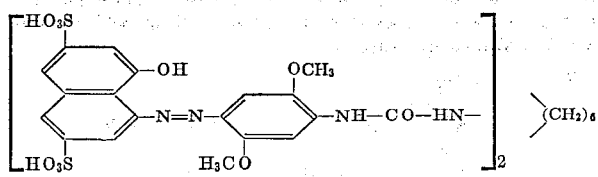

is obtained as a red-brown powder. Yield 83%; absorption maximum 505 nm. measured in DMF/water (1:1) and 462 nm. in gelatine.

The dyestuffs of Tables I and II below are manufactured analogously to Example 1.

TABLE I

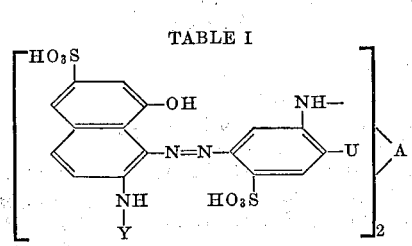

| Dyestuff number | Y | U | A | Absorption maximum in nm. measured in— | |
|---|---|---|---|---|---|
| | | | | DMF/H₂O (1:1) | Gelatine |
| 101 | 2,6-(CH₃)₂-C₆H₃ | H | —OC—HN—C₆H₄—NH—CO— | 522+540 | 530+562 |
| 102 | Same as above | CH₃ | Same as above | 517+538 | 527+548 |
| 103 | do | H | —OC—HN—C₆H₃(CH₃)—NH—CO— | 521+540 | 533+567 |
| 104 | do | H | —OC—HN(CH₂)₆NH—CO— | 520+540 | 526+544 |
| 105 | 2,6-(H₃CO)₂-C₆H₃ | H | —OC—HN—C₆H₄—NH—CO— | 530 | 535+558 |
| 106 | Same as above | H | —OC—HN—C₆H₃(CH₃)—NH—CO— | 526 | 536+561 |
| 107 | 2-CH₃-4-Cl-C₆H₃ | H | —OC—HN—C₆H₄—NH—CO— | 518+536 | 524+543 |
| 108 | Same as above | H | —OC—HN—C₆H₃(CH₃)—NH—CO— | 522+540 | 536+558 |
| 109 | do | H | —OC—HN(CH₂)₆NH—CO— | 520+542 | 530+546 |
| 110 | 4-Cl-C₆H₄ | H | —OC—HN—C₆H₄—NH—CO— | 531 | 544+572 |
| 111 | CH₃ | H | —OC—HN—C₆H₄—NH—CO— | 524+545 | 526+549 |
| 112 | 2,6-(CH₃)₂-C₆H₃ | H | —OC—HN—C₆H₄—NH—CO— (ortho) | 520+540 | 522+544 |
| 113 | Same as above | OCH₃ | —OC—HN—C₆H₄—NH—CO— | 520+546 | 524+551 |

TABLE II

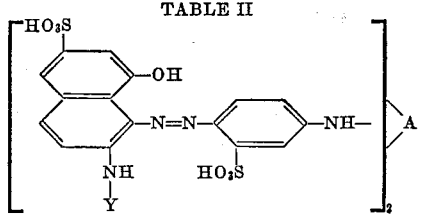

| Dyestuff number | Y | A | Absorption maximum in nm. measured in— DMF/H₂O (1:1) | Gelatine |
|---|---|---|---|---|
| 201 | H | —OC—HN—⟨⟩—HN—CO— | 520+540 | 524 |
| 202 | H | —OC—HN—⟨⟩(—CH₃)—NH—CO— | 518+540 | 521+551 |
| 203 | H | —OC—HN—⟨⟩—CH₂—⟨⟩—NH—CO— | 518+540 | 521+550 |
| 204 | H | —OC—HN(CH₂)₆—NH—CO— | 516+540 | 520+548 |
| 205 | CH₃ | —OC—HN—⟨⟩—NH—CO— | 536+565 | 534+570 |
| 206 | H₃C—⟨⟩—CH₃ (with CH₃) | ......do...... | 538+554 | 536+564 |
| 207 | H | —OC—HN—⟨⟩—NH—CO— | 521+550 | 520+540 |
| 208 | H | —OC—HN—⟨⟩—N=N—⟨⟩—NH—CO— | 518+540 | 520+550 |
| 209 | H | —OC—HN—⟨⟩—SO₂—⟨⟩—NH—CO— | 518+540 | 527+556 |

USE EXAMPLES

Example 1

3.3 ml. of 6% strength gelatine solution, 2.0 ml. of 1% strength aqueous solution of the hardener of the formula (301)
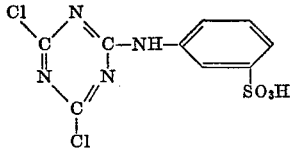

1.0 ml. of 1% strength aqueous solution of the purple dyestuff of the Formula 101 and 3.3 ml. of silver bromide emulsion containing 35 g. of silver per litre are pipetted into a test tube and made up to 10.0 ml. with deionized water. This solution is vigorously mixed and kept for 5 minutes in a water bath at 40° C.

The casting solution, at 40° C., is cast onto a substrated glass plate of size 13 cm. x 18 cm. After solidifying at 10° C., the plate is dried in a circulating air drying cabinet at 32° C.

A strip cut to 3.5 cm. x 18 cm. is exposed with 50 Lux/cm.² for 3 seconds under a step wedge through a Kodak 2b+49 blue filter.

It is then further processed as follows:

(1) 10 minutes' development in a bath which per litre contains 1 g. of p-methylaminophenol sulphate, 20 g. of anhydrous sodium sulphite, 4 g. of hydroquinone, 10 g. of anhydrous sodium carbonate and 2 g. of potassium bromide;

(2) 2 minutes' soaking;

(3) 6 minutes' stop-fixing in a bath which per liter contains 200 g. of crystalline sodium thiosulphate, 15 g. of anhydrous sodium sulphite, 25 g. of crystalline sodium acetate and 13 ml. of glacial acetic acid;

(4) 8 minutes' soaking;

(5) 20 minutes' dye-bleaching in a bath which per liter contains 27.5 ml. of 96% strength sulphuric acid, 10 g. of potassium iodide and 15 ml. of a solution of 0.3 g. of 2,3-dimethyl-6-aminoquinoxaline in 50 ml. of ethanol;

(6) 4 minutes' soaking;

(7) 8 minutes' bleaching of residual silver in a bath which per liter contains 50 g. of potassium ferricyanide, 15 g. of potassium bromide, 10 g. of disodium phosphate and 14 g. of monosodium phosphate;

(8) 6 minutes' soaking;

(9) 6 minutes' fixing as specified under (3);

(10) 10 minutes' soaking.

A brilliant, light-fast purple wedge is obtained which is completely bleached to white in the position of originally the greatest silver density.

Similar results are obtained by using one of the remaining dyestuffs of Tables I and II.

EXAMPLE 2

The following layers are successively applied to an opaque white acetate film provided with an adhesive layer:

(1) Red-sensitive silver bromide emulsion in gelatine, containing the greenish-blue dyestuff of the formula (302)

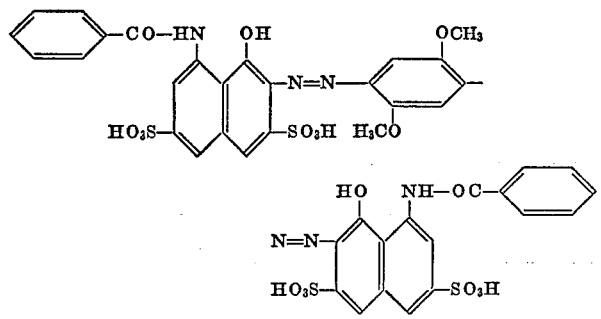

(2) Colorless gelatine layer without silver halide.

(3) Green-sensitive silver bromide emulsion in gelatine, containing the purple dyestuff of the Formula 203.

(4) Blue-sensitive silver bromide emulsion in gelatine, containing the yellow dyestuff of the formula (303)

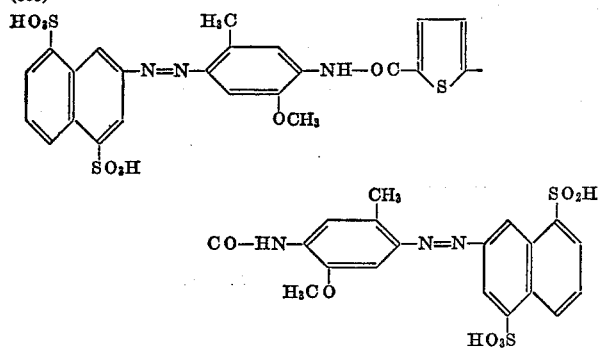

The gelatine layers can additionally contain additives such as wetting agents, hardeners and stabilizers for the silver halide. In other respects, the procedure followed is that the individual layers contain, per square metre of film, 0.5 g. of the particular dyestuff and the amount of silver bromide corresponding to 1–1.2 g. of silver.

This film is exposed under a colored diapositive with red, green and blue copying light. Thereafter, the copy is developed in accordance with the instructions indicated in Example 1.

A light-fast document-quality positive direct-viewing image is obtained.

Similar results are obtained if instead of the dyestuff of the Formula 203 a different dyestuff from Tables I and II is used.

EXAMPLE 3

3.3 ml. of 6% strength gelatine solution, 2.0 ml. of 1% strength aqueous solution of the hardener of the Formula 301, 3.3 ml. of silver bromide emulsion containing 35 g. of silver per liter, and 1.4 ml. of deionized water are pipetted into a test tube.

The components are thoroughly mixed and the mixture is kept in a water bath at 40° C. for 5 minutes.

The casting solution, at 40° C. is cast onto a substrated glass plate of size 13 cm. x 18 cm. After solidifying at 10° C., the plate is dried in a circulating air drying cabinet at 32° C.

A mixture of 3.3 ml. of 6% strength gelatine solution, 2.0 ml. of 1% strength aqueous solution of the hardener of the Formula 301, 0.5 ml. of 1% strength aqueous solution of the purple dyestuff of the Formula 102 and 4.2 ml. of deionized water is then cast onto the dried layer at 40° C.

This mixture is allowed to solidify and dry as indicated above.

A strip cut to 3.5 cm. x 18 cm. is exposed with 50 Lux/cm.² for 10 seconds under a step wedge through a Kodak 2b+49 blue filter.

Subsequently, the procedure described in Example 1 is followed.

A brilliant, very light-fast purple wedge is obtained, which is completely bleached to white in the position of originally the greatest silver density.

Similar results are obtained if instead of the dyestuff of the Formula 102 a different dyestuff from Tables I and II is used.

EXAMPLE 4

A test strip manufactured and exposed in accordance with Example 1 is processed as follows:

(1) 5 minutes' development in a bath which per liter contains 1 g. of p-methylaminophenol sulphate, 20 g. of anhydrous sodium sulphite, 4 g. of hydroquinone, 10 g. of anhydrous sodium carbonate, 2 g. of potassium bromide and 3 g. of sodium thiocyanate;

(2) 2 minutes' soaking;

(3) 2 minutes' treatment in a reversal bath which per liter contains 5 g. of potassium bichromate and 5 ml. of 96% strength sulphuric acid;

(4) 4 minutes' soaking;

(5) 5 minutes' treatment in a bath which per liter contains 50 g. of anhydrous sodium sulphite;

(6) 3 minutes' soaking;

(7) 4 minutes' development in a bath which per liter contains 2 g. of 1-phenyl-3-pyrazolidone, 50 g. of anhydrous sodium sulphite, 10 g. of hydroquinone, 50 g. of anhydrous sodium carbonate, 2 g. of sodium hexametaphosphate and 20 ml. of a 1% strength aqueous solution of tert.-butylaminoborane;

(8) 2 minutes' soaking;

(9) Further treatment as described in Example 1 under (5) to (10).

A brilliant, highly light-fast purple wedge converse to the primary original is obtained.

Similar results are obtained when using one of the remaining dyestuffs of Tables I and II.

What is claimed is:

1. An azo dyestuff of the formula

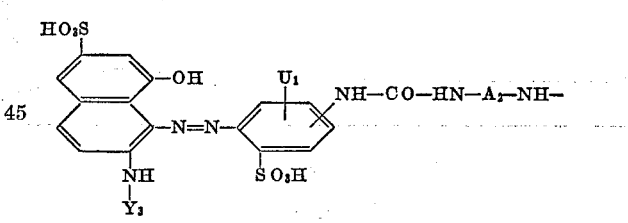

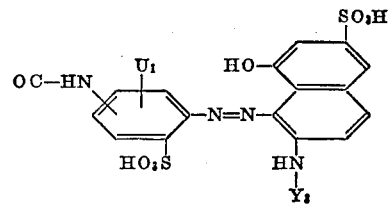

wherein $A_2$ denotes

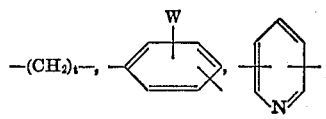

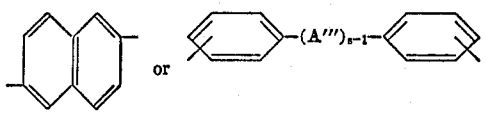

wherein $t$ denotes an integer from 1 to 6, W denotes hydrogen atom or methyl, $A'''$ denotes —$CH_2$—, —CO—, —O—, —S— or —$SO_2$— and $s$ denotes the number 1 or 2, $U_1$ denotes hydrogen methyl or ethyl, $Y_3$ represents hydrogen or

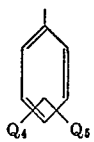

wherein $Q_4$ denotes halogen, trifluoromethyl, methyl, methoxy, methylcarbonyl, methylsulfonyl or a sulfonic acid group and $Q_5$ denotes hydrogen, chlorine, methyl or methoxy.

2. Azo dyestuffs according to claim 1, of the formula

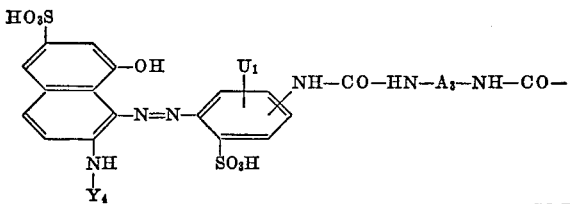

wherein $U_1$ represents hydrogen, methyl or methoxy and $A_3$ represents

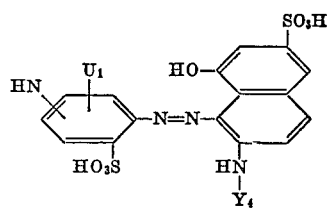

and $Y_4$ represents hydrogen, methyl or

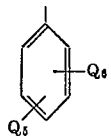

wherein $Q_5$ hydrogen, chlorine, methyl or methoxy and $Q_6$ denotes chlorine, methyl or methoxy.

3. An azo dyestuff according to claim 2, of the formula

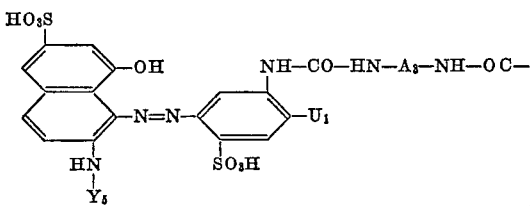

wherein $A_3$ and $U_1$ have the meanings indicated in claim 2, and $Y_5$ denotes hydrogen, methyl or the radical

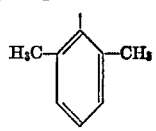

4. An azo dyestuff according to claim 3, of the formula

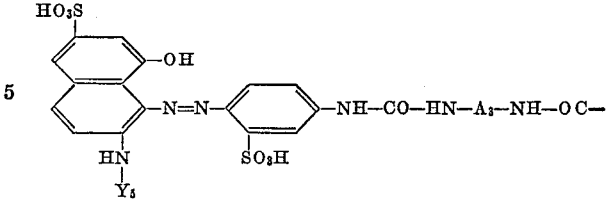

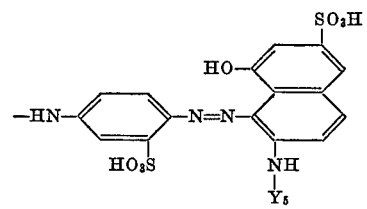

wherein $A_3$ and $Y_5$ have the meanings indicated in claim 3.

5. The azo dyestuff according to claim 3, of the formula

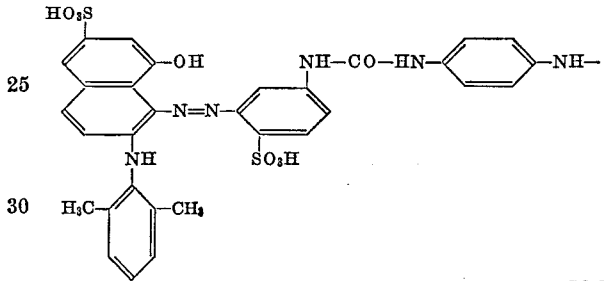

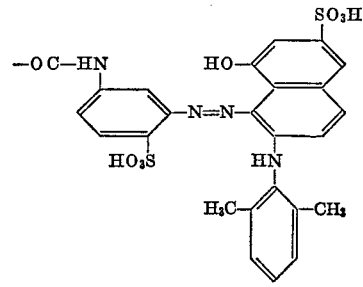

6. The azo dyestuff according to claim 4, of the formula

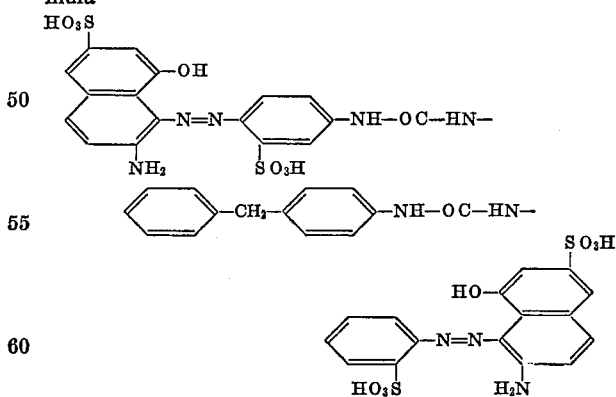

References Cited
UNITED STATES PATENTS

| | | | |
|---|---|---|---|
| 3,598,594 | 8/1971 | Freytag et al. | 260—175 XR |
| 2,518,023 | 8/1950 | Keller et al. | 260—175 |
| 2,988,544 | 6/1961 | Frey et al. | 260—173 |
| 3,454,402 | 7/1969 | Andereau et al. | 96—99 |

FLOYD D. HIGEL, Primary Examiner

U.S. Cl. X.R.

96—66 R, 75; 260—152, 156, 196, 198, 199, 205, 453 AP, 453 AR, 507 R, 509